United States Patent
Pieterse et al.

(10) Patent No.: US 7,901,648 B2
(45) Date of Patent: *Mar. 8, 2011

(54) METHOD FOR THE DECOMPOSITION OF $N_2O$, CATALYST THEREFOR AND PREPARATION OF THIS CATALYST

(75) Inventors: Johannis Alouisius Zacharias Pieterse, Alkmaar (NL); Rudolf Willem Van Den Brink, Schagen (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/722,914

(22) Filed: Mar. 12, 2010

(65) Prior Publication Data

US 2010/0166632 A1     Jul. 1, 2010

Related U.S. Application Data

(62) Division of application No. 11/596,489, filed on Aug. 27, 2007, now Pat. No. 7,704,474.

(51) Int. Cl.
*B01D 53/56* (2006.01)
(52) U.S. Cl. .................................... 423/239.2
(58) Field of Classification Search .............. 423/239.2; 502/74, 325, 326
See application file for complete search history.

(56) References Cited

U.S. PATENT DOCUMENTS

| | | | |
|---|---|---|---|
| 4,902,392 A | 2/1990 | Aufdembrink et al. | |
| 5,041,272 A | 8/1991 | Tamura et al. | |
| 5,149,512 A | 9/1992 | Li et al. | |
| 5,160,033 A * | 11/1992 | Vassilakis et al. | 208/111.15 |
| 5,171,553 A * | 12/1992 | Li et al. | 423/239.2 |
| 5,536,687 A * | 7/1996 | Ward | 502/67 |
| 5,908,806 A | 6/1999 | Kharas | |
| 5,968,466 A * | 10/1999 | Kharas | 423/239.2 |
| 6,274,107 B1 * | 8/2001 | Yavuz et al. | 423/213.5 |
| 7,704,474 B2 * | 4/2010 | Pieterse et al. | 423/239.2 |
| 2004/0192538 A1 | 9/2004 | Hamon et al. | |
| 2005/0202955 A1 | 9/2005 | McMinn et al. | |

FOREIGN PATENT DOCUMENTS

| | | |
|---|---|---|
| JP | 6142517 | 5/1994 |
| JP | 6154603 | 6/1994 |
| JP | 6154604 | 6/1994 |
| JP | 06154611 | 6/1994 |
| JP | 6198187 | 7/1994 |
| WO | 9934901 A1 | 7/1999 |
| WO | 2004009220 | 1/2004 |

OTHER PUBLICATIONS

IZA Structure Commission, Database of Zeolite Structures, BEA, www.zeolites.ethz.ch/zeolites, Mar. 18, 2004.
IZA Structure Commission, Database of Zeolite Structures, MOR, www.zeolites.ethz.ch/zeolites, Mar. 18, 2004.
IZA Structure Commission, Database of Zeolite Structures, FER, www.zeolites.ethz.ch/zeolites, Mar. 18, 2004.
IZA Structure Commission, Database of Zeolite Structures, CHA, www.zeolites.ethz.ch/zeolites, Mar. 18, 2004.

* cited by examiner

*Primary Examiner* — Timothy C Vanoy
(74) *Attorney, Agent, or Firm* — The Webb Law Firm

(57) ABSTRACT

The invention relates to a method for the catalytic decomposition of $N_2O$ in a gas containing $N_2O$ in the presence of a catalyst, wherein the catalyst comprises a zeolite that has been loaded with a first metal selected from the group of noble metals consisting of ruthenium, rhodium, silver, rhenium, osmium, iridium, platinum and gold, and with a second metal selected from the group of transition metals consisting of chromium, manganese, iron, cobalt, nickel and copper, and wherein the loading of the zeolite with metals has been obtained by first loading the zeolite with the noble metal and then with the transition metal, as well as a catalyst for this method and a method for the preparation of this catalyst.

10 Claims, No Drawings

METHOD FOR THE DECOMPOSITION OF $N_2O$, CATALYST THEREFOR AND PREPARATION OF THIS CATALYST

CROSS REFERENCE TO RELATED APPLICATIONS

This application is a divisional application of U.S. patent application Ser. No. 11/596,489 filed on Aug. 27, 2007 ("the '489 Application"), which has issued as U. S. Pat. No. 7,704,474 on Apr. 27, 2010.

FIELD OF THE INVENTION

The invention relates to a method for the catalytic decomposition of $N_2O$ in a gas containing $N_2O$. The invention also relates to a catalyst therefor, as well as the preparation of this catalyst.

STATE OF THE ART

Dinitrogen oxide or laughing gas ($N_2O$) contributes substantially to the greenhouse effect and has a high global warming potential (the degree to which a molecule contributes to the greenhouse effect relative to a molecule of $CO_2$). Over the past few years a policy has been developed for reducing the emission of greenhouse gases. Various significant sources of $N_2O$ emissions have been identified: agriculture, the industrial production of precursors for nylon (adipic acid and caprolactam), the production of nitric acid and motor vehicles equipped with a three-way catalyst.

Various catalytic and non-catalytic techniques can be used to render laughing gas harmless. Various catalysts are known for, for example, the catalytic decomposition or conversion of $N_2O$ into $N_2$ and $O_2$ (for example JP Patent Application no. Hei-06-154611, in which catalysts based on supports with transition metals and noble metals are described). However, this reaction with catalysts according to the state of the art is severely impeded by the presence of oxygen and water, which occur in the off-gases from virtually all the abovementioned sources of $N_2O$.

A promising alternative is selective catalytic reduction. Various catalysts are known from the literature for the conversion of $N_2O$ with the aid of reducing agents such as alkenes ($C_nH_{2n}$), alcohols or ammonia. On technical and economic grounds, additions of saturated hydrocarbons ($C_nH_{2n+2}$) would be preferred to the said reducing agents. In particular natural gas ($CH_4$) and LPG (mixture of $C_3H_8$ and $C_4H_{10}$) are attractive in this context.

A disadvantage of the method using catalysts that are able to reduce $N_2O$ with the aid of hydrocarbons is that additional facilities for hydrocarbons have to be put in place and hydrocarbons and/or CO can be emitted. From the environmental standpoint, an additional catalyst is often used to avoid the emission of hydrocarbons.

WO2004009220 describes the catalytic reduction of $NO_x$, but this disclosure does not provide a method for the catalytic decomposition of $N_2O$.

A disadvantage of many known catalysts for decomposition of $N_2O$ is that these catalysts are often unstable and/or are deactivated by the presence of gases such as $NO_x$ (NO, $NO_2$, $N_2O_3$ (x=3/2), etc.), $O_2$ and $H_2O$. However these gases are virtually always present in practical situations, such as for the decomposition of $N_2O$ from flue gases.

SUMMARY OF THE INVENTION

The aim of the invention is, therefore, to provide a method for the catalytic decomposition of $N_2O$ where the abovementioned disadvantages are completely or partially eliminated. A further aim of the invention is to provide a catalyst for use in this method, as well as a method for the preparation of this catalyst.

Surprisingly it is found that the catalysts according to the invention give good conversion of $N_2O$, even at low temperatures, are stable during the decomposition reaction (of $N_2O$ into $N_2$ and $O_2$) and also give good conversion and have good stability if other gases (such as NO, $NO_2$, $N_2O_3$, etc., $O_2$ and $H_2O$) are also present in the gas containing $N_2O$. In addition, advantageously no hydrocarbon has to be added to the gas containing $N_2O$. Therefore these catalysts are exceptionally suitable for the decomposition of $N_2O$.

The invention relates to a method for the catalytic decomposition of $N_2O$ in a gas containing $N_2O$ in the presence of a catalyst, wherein the catalyst comprises a zeolite that has been loaded with a first metal selected from the group of noble metals consisting of ruthenium, rhodium, silver, rhenium, osmium, iridium, platinum and gold, preferably ruthenium, rhodium, osmium and iridium, and with a second metal selected from the group of transition metals consisting of vanadium, chromium, manganese, iron, cobalt, nickel and copper, and wherein the loading of the zeolite with metals has been obtained by first loading the zeolite with the noble metal and then with the transition metal.

The invention also provides a method for the preparation of a catalyst for the catalytic decomposition of $N_2O$ in a gas containing $N_2O$, wherein the catalyst comprises a zeolite and the zeolite is first loaded with a first metal selected from the group of noble metals consisting of ruthenium, rhodium, silver, rhenium, osmium, iridium, platinum and gold and then loaded with a second metal selected from the group of transition metals consisting of vanadium, chromium, manganese, iron, cobalt, nickel and copper.

The invention furthermore also provides a catalyst that can be obtained according to this method and, for example, contains 0.00001-4% (m/m) of the first metal and 0.1-10% (m/m) of the second metal, as well as the use of this catalyst for the decomposition of $N_2O$.

DESCRIPTION OF THE INVENTION

The gas containing $N_2O$ can be, for example, off-gas from the synthesis of nitric acid or, for example, off-gas that is liberated during the production of nylon precursors. The gas can also contain oxygen and/or water. In contrast to the majority of catalysts according to the state of the art, the catalyst according to the invention loses little or no activity in the presence of oxygen, water or both. This applies in particular if the water is present in amounts of up to approx. 5-10% (V/V) (percent by volume; percent by volume relates to the volume of the gas containing $N_2O$, including any $NO_R$, $O_2$ and $H_2O$, etc. present). Up to approx. 20%, for example 0.5-20% (V/V), oxygen can be present, for example. $NO_x$ can also be present, for example from approx. 10 ppm-5% $NO_x$, for example 10 ppm-1% (V/V) $NO_x$. Therefore, in one embodiment the invention is aimed at a method where the gas containing $N_2O$ also contains oxygen and/or water, as well as a method where the gas containing $N_2O$ also contains one or more gasses selected from the group consisting of oxygen, water and $NO_x$ (for example all three gases are present alongside $N_2O$). Therefore, in the context of the invention, gas containing $N_2O$ means that the gas in any event contains $N_2O$ and in addition can contain other gases such as $N_2$, $NO_x$, $H_2O$, $O_2$, etc. This gas (or gas mixture) can, as is known to those skilled in the art, be brought into contact with a catalyst. "Decomposition of $N_2O$ in a gas containing $N_2O$" means that $N_2O$ that is present in the gas is in any event partially decomposed (with the aid of the catalyst according to the invention) to give $N_2$ and $O_2$.

More particularly, the invention is aimed at a method for the catalytic decomposition of $N_2O$ in a gas containing $N_2O$, comprising:

the provision of a catalyst, wherein the catalyst comprises a zeolite that has been loaded with a first metal selected from the group of noble metals consisting of ruthenium, rhodium, silver, rhenium, osmium, iridium, platinum and gold and with a second metal selected from the group of transition metals consisting of vanadium, chromium, manganese, iron, cobalt, nickel and copper;

the provision of a gas containing $N_2O$ and feeding the gas containing $N_2O$ through a chamber that contains the catalyst, wherein the chamber, the gas containing $N_2O$ or both are heated if required.

The gas containing $N_2O$ is contacted with the catalyst according to the invention and $N_2O$ is at least partially decomposed in a composition reaction. During the reaction it is possible, if required, to heat up to a temperature at which (complete or partial) decomposition of $N_2O$ can take place; however, the gas containing $N_2O$ can, as off-gas, already have the desired temperature or be cooled to the desired temperature. The chamber is, for example, a reactor (chamber), a reaction tube, or any other space where the $N_2O$-containing gas can be brought into contact with the catalyst of the invention, as is known to those skilled in the art. Preferably, the chamber is a reactor, designed to decompose $N_2O$, as known to the person skilled in the art.

In the description of the invention $NO_x$ is defined as nitrogen oxides where x is greater than or equal to 1, such as NO, $NO_2$, $N_2O_3$, etc. Thus, $N_2O$, laughing gas, is not understood as falling under this term. NO is usually in equilibrium with other nitrogen oxides, where x is greater than 1. The catalyst according to the invention is found to be exceptionally suitable for the decomposition of $N_2O$ from a gas containing $N_2O$, without the stability suffering from the possible presence of NO, $NO_2$, etc. ($NO_x$). Therefore, in one embodiment the invention also provides a method where the gas containing $N_2O$ also contains $NO_x$, where x is equal to or greater than 1, for example x=1, 3/2, 2, etc. Of course, the gas can also contain combinations of such $NO_x$ compounds. Hence, in an embodiment the $N_2O$-containing gas contains at least $N_2O$ and $NO_x$.

In particular the present invention is aimed at the decomposition of $N_2O$ where the gas containing $N_2O$ essentially does not contain any hydrocarbon. The gas containing $N_2O$ preferably contains less than 200 ppm, more preferably less than 50 ppm, even more preferably less than 20 ppm hydrocarbon, based on the total amount of gas containing $N_2O$, or, for example, less than 5% (V/V), preferably less than 3% (V/V), more preferably less than 1% (WV) hydrocarbon, based on the amount of $N_2O$ in the gas containing $N_2O$. More particularly, the gas essentially contains no $C_nH_{2n+2}$ (where n is preferably selected from 1-4, including all isomers).

The process conditions for the method for the catalytic decomposition of $N_2O$ in a gas containing $N_2O$ will depend on the applications. Those skilled in the art will in general choose the catalyst volume, the gas velocity, the temperature, the pressure, etc. such that the best conversion results are achieved. Good results are achieved with, for example, an $N_2O$ content of approx. 100 ppm or more, for example approx. 100-100,000 ppm of the gas containing $N_2O$. Under practical conditions the quantity of $N_2O$ will in general be between approx. 100 and 3000 ppm of the gas containing $N_2O$. The gas containing $N_2O$ is preferably fed at gas space velocities (GHSV; gas hourly space velocity) of approx. 200-200,000 $h^{-1}$, preferably 1000-100,000 $h^{-1}$, where this value relates to the catalyst volume used. The pressure of the gas containing $N_2O$ will depend on the application and can be, for example, between approx. 1-50 bara (bar atmosphere: bara), preferably between approx. 1-25 bara. The method can be used at relatively low temperatures. The conversion of $N_2O$ takes place from approx. 300° C. Virtually complete conversion can already take place at approx. 375° C., depending on the conditions, such as, for example, the gas space velocity, volume and catalyst loading, etc. Preferably a method where the reaction temperature is between 300° C. and 600° C., more preferentially between 350° C. and 500° C., and even more preferably between about 375 and 475° C., is used. In yet a further embodiment, the reaction temperature is between about 300° C. and 450° C., more preferably between about 350° C. and 425° C., and even more preferably below 400° C., and the gas containing $N_2O$ is fed at gas space velocities (GHSV; gas hourly space velocity) of approx. 200-20,000 $h^{-1}$, preferably 1000-15,000 $h^{-1}$, even more preferably about 6000-10,000 $h^{-1}$, where this value relates to the catalyst volume used.

The method according to the invention can be used, inter alia, for the catalytic reduction of $N_2O$ that is emitted, for example, by emergency power generators, gas engines, installations for nitric acid production, $N_2O$ that is emitted during caprolactam production, during coal combustion in a fluidised bed, etc. Therefore, the invention is also aimed at the use of the catalyst according to the invention for, for example, the catalytic decomposition of $N_2O$. The method according to the invention can also be used in combination with a catalyst for the removal of $NO_x$, which, for example, is also emitted during the industrial production of nitric acid.

Zeolites that are used in the method according to the invention are, for example, the following zeolites, as are known to those skilled in the art by their abbreviations (for example Atlas or zeolite framework types, Ch. Baerlocher, W. M. Meier, D. H. Olson, 2001, Elsevier Science, ISBN: 0-444-50701-9): ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CFI, CGF, CGS, CHA, -CHI, -CLO, CON, CZP, DAC, DDR, DFO, DFT, DOH, DON, EAB, EDI, EMT, EPI, ERI, ESV, ETR, EUO, FAU, FER, FRA, GIS, GME, GON, GOO, HEU, IFR, ISV, ITE, ITH, ITW, IWR, IWW, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAB, NAT, NES, NON, NPO, OFF, OSI, OSO, -PAR, PAU, PHI, PON, RHO, -RON, RSN, RTE, RTH, RUT, RWY, SAO, SAS, SAT, SAV, SBE, SBS, SBT, SFE, SFF, SFG, SFH, SFN, SGT, SOD, SSY, STF, STI, STT, TER, THO, TON, TSC, UEI, UFI, UOZ, USI, VET, VFI, VNI, VSV, WEI, -WEN, YUG, ZON. Combinations of (loaded) zeolites can also be used.

Preferably zeolites based on silicon and aluminium, with an Si/Al ratio of 2-60, preferably 2.5-30, are used. For example, good results are obtained where the zeolite is selected from the group consisting of FAU, FER, CHA, MOR, MFI, BEA, EMT, CON BOG and ITQ-7. In a preferred embodiment the invention is aimed at a method where the zeolite is selected from the group consisting of FER, CHA, MOR and BEA. Especially preferred are FER, CHA and BEA and even more preferred are FER and BEA. Especially BEA shows a surprising high stability in the $N_2O$-decomposition method of the invention.

Part of the zeolite framework ions may have been replaced with other ions like Fe, Ti etc., as known to the person skilled in the art. For example, up to about 5 mol % of Si or Al may have been replaced by Fe or Ti or other ions, like Ga or Ge, or combinations of two or more of such ions. Such a replacement of framework ions may be effected by replacing part of the "framework ions to be" in the starting materials by Fe or Ti (or other ions), as is known to the person skilled in the art. If desired, the zeolite may be subjected to a steam treatment, after synthesis of the zeolite or after the subsequent loading with the first and second metal, such that part of this framework metal may become available within the pores as catalytically active sites. In such a way, Co—Rh-BEA or Ni—Ru-MFI having Fe as framework ion may for example be converted to Fe,Co—Rh-BEA or Fe,Ni—Ru-MFI, respectively.

In yet another preferred embodiment zeolites such as FER, CHA and MFI (ZSM-5) are used, which zeolites have relatively small channels and do not have excessively large rings such as 12-membered rings. Zeolites in this embodiment can have 4, 5, 6, 8 or 10-membered rings (or combinations thereof). In a variant embodiment the invention is aimed at a method and a catalyst where the second metal is a trivalent metal such as iron (FeIII) and where the zeolite is selected from the group consisting of zeolites that have 4, 5, 6, 8 or 10-membered rings (or combinations thereof) but no rings contain more than 10 members. In another variant embodiment the invention is aimed at a method and a catalyst where the second metal is a divalent metal such as cobalt (CoII) and where the zeolite is selected from the group consisting of zeolites that have 4, 5, 6, 8, 10 or 12-membered rings (or combinations thereof) and where the zeolite contains at least 10- or 12-membered rings (or both).

There are various ways of preparing the catalyst according to the invention. The zeolite can be loaded with the aid of methods such as are known to those skilled in the art, for example with the aid of wet impregnation (volume of liquid with (dissolved) salt is greater than pore volume of zeolite) and pore volume impregnation ("dry impregnation" or "incipient wetness": volume of liquid with (partially dissolved) salt is equal to pore volume of zeolite) or via ion exchange (exchange in the liquid phase, where the metals to be exchanged in any event are at least partially dissolved in the liquid phase as ions (or complexed ions); and where the zeolite is stirred in the liquid containing ions to be exchanged, as is known to those skilled in the art) or with the aid of chemical vapour deposition (CVD). Preferably a method for the catalytic decomposition of $N_2O$ in a gas containing $N_2O$ is used where the zeolite that is used for this composition has been loaded with the first metal by means of ion exchange or impregnation and a subsequent loading with the second metal and is used as such, or after possible further steps such as drying, sieving and/or calcination, applying to a support, etc., for the catalytic decomposition of $N_2O$ in a gas containing $N_2O$. In a preferred embodiment a method is used where the zeolite has been loaded with the first metal by means of ion exchange.

The same applies for the second metal. Therefore, preferably a method is used where the zeolite has been loaded with the second metal by means of ion exchange or impregnation; in an embodiment a method is used where the zeolite has been loaded with the second metal by means of ion exchange. In a specific embodiment a method for the catalytic decomposition of $N_2O$ in a gas containing $N_2O$ is used where the zeolite has been loaded with the first metal and the second metal by means of ion exchange (sequential). This yields good decomposition values.

In this invention metal is used to mean that an element that is known to those skilled in the art as a metal (for example the metals from groups 3-12 of the periodic table of the elements (IUPAC notation) is used in the invention. In the invention transition metals are metals from groups 3-12 of the periodic table of the elements (IUPAC notation), also known as the groups Ib, IIb-VIIb and VIII. The second metal is used to refer to those transition metals that are not at the same time also a noble metal. Noble metals are the metals Ru, Rh, Pd, Ag, Re, Os, Ir, Pt and Au. In the invention, Ru, Rh, Ag, Re, Os, Ir, Pt and Au, and preferably, Ru, Rh, Os and Jr (group 8 and 9 noble metals) are used. When loading the zeolite, in general salts in solution (ion exchange), where the metal is present in ion form (usually in water), or solutions (wet or pore volume impregnation (incipient wetness)), where the metal is present as ion in solution and/or as ion in a salt compound, will be used. Because ion exchange (in the liquid phase) or pore volume impregnation is preferably used, after preparation and before calcination the catalyst will generally comprise a zeolite in which the metal is present in ion form (and coordinated with Al). After calcination and/or while carrying out the method according to the invention some of the metal in ion form can be converted to oxide and/or to metal at the exchange locations, for example by clustering to give particles. This behaviour of zeolites exchanged with metals is known to those skilled in the art. In this invention, metal is therefore also used to refer to metal ion and, for example after loading of (the application of the metals to) the zeolite, metal can further also comprise metal oxide or metal salt (for example chloride, oxycloride, nitrate, sulphate, etc.).

In one embodiment a method is used where the zeolite has been loaded with the first metal by means of ion exchange. This can lead to a zeolite where 2-50% of the Al has been coordinated by the first metal; more preferentially approx. 5-40% of the Al has been coordinated by the first metal. This can be determined with the aid of, for example, IR techniques, etc. Thus, for example, the integral intensity of the bridged OH stretch vibration (approx. 3600 $cm^{-1}$, depending on the type of zeolite and the measurement temperature) of an activated zeolite can be compared with the same zeolite loaded with the metal of choice. This integral intensity correlates with the concentration of aluminium in the zeolite. As a result of exchanging with the metal of choice the integral intensity decreases and the difference in intensity (before/after exchange) is the amount of metal that coordinates with aluminium.

After loading the zeolite, the zeolite is generally dried. It can then be calcined. Instead of calcination (heating in air, oxygen) it is also possible to reduce (heating in a reducing atmosphere) or activate in an inert atmosphere (heating in an inert atmosphere). Such procedures are known to those skilled in the art as 'post-modification' procedures. Calcination is generally carried out in air at, for example, 400-550° C. Reduction can be effected with hydrogen at, for example, 300-500° C. Inert activation can be done with the aid of nitrogen, argon, helium, etc., at, for example, approx. 300-550° C. These procedures usually take a few hours.

Good decomposition results are obtained if a method is used where the first metal has been selected from the group consisting of ruthenium, rhodium, osmium and iridium. In another embodiment a zeolite is used where the second metal is selected from the group consisting of iron, cobalt and nickel. Preferably, a method for the catalytic decomposition of $N_2O$ in a gas containing $N_2O$ is used where the first metal has been selected from the group consisting of ruthenium, rhodium, osmium and iridium and where the second metal has been selected from the group consisting of iron, cobalt and nickel. In a preferred embodiment, a method and a catalyst for decomposition of $N_2O$ are provided, wherein the catalyst comprises a zeolite and wherein the zeolite is selected from the group consisting of FAU, FER, CHA, MOR, MR BEA, EMT, CON, BOG and ITQ-7. Preferred first metals are selected from the group consisting of ruthenium, rhodium, osmium and iridium.

Specific preferred embodiments comprise methods according to the invention and catalysts according to the invention where the second metal is Fe and the zeolite is FER, or where the second metal is Co and the zeolite is MOR. In another preferred embodiment the invention comprises a method and catalyst where the second metal is Co and the zeolite is FER, for example Co—Rh-FER, or where the second metal is Fe and the zeolite is MOR, for example Fe—Rh-MOR. Therefore, the invention is also aimed at a method and a catalyst where the zeolite loaded with metals has been selected from the group consisting of Fe—Rh-FER, Fe—Ir-FER, Fe—Ru-FER, Co—Rh-MOR, Co—Ir-MOR, Co—Ru-MOR, Fe—Rh-MOR, Fe—Ir-MOR, Fe—Ru-MOR, Co—Rh-FER, Co—Ir-FER and Co—Ru-FER. Further preferred catalysts are Fe—Rh-BEA, Fe—Ir-BEA, Fe—Ru-BEA, Co—Rh-BEA, Co—Ir-BEA and Co—Ru-BEA The catalyst according to the invention preferably comprises a zeolite that contains approx. 0.00001-4% (m/m) of the first metal (0.00001% (m/m) is 10 ppm) and approx. 0.1-10% (m/m) of the second metal. More preferentially, the zeolite contains approx. 0.01 to 0.5% (m/m), more preferably 0.1-0.5% (m/m), of the first metal and approx. 0.5 to 4% (m/m), more preferably 1-4% (m/m), of the second metal. Of course, combinations of "first" metals can also be used, as well as combinations of "second" metals, etc., for example: Fe—Ir,Ru-FER, Co,Ni—Ir-MOR and Co,Ni—Rh,Os-MOR etc. Likewise, a first and a second loading do not preclude one or more subsequent loadings.

The catalyst according to the invention preferably comprises the zeolite only. In another embodiment the catalyst comprises zeolite and a quantity of support, for example 0.1-50% (m/m) of boehmite, for example in the form of pellets or applied to a monolite, as is known to those skilled in the art. The amounts of metal (first metal and second metal) are related to the amount of zeolite; the metals are present on and in the zeolite.

Known salts, such as, for example, readily soluble nitrates are used for the ion exchange. The zeolite used can be, for example, the H, Na, K or $NH_4$ form of the zeolite, such as, for example, $NH_4$-MOR or H-FAU, etc. Exchange is continued for such a length of time (or so often) that approx. 0.00001-4% (m/m) of the first metal is present in the zeolite. The zeolite can also be loaded in other ways (pore volume impregnation, etc.). The zeolite is then preferably filtered off, washed and optionally dried. The zeolite is then loaded with 0.1-10% (m/m) of the second metal. This can be done by ion exchange (in the liquid phase) or by pore volume impregnation (incipient wetness technique), etc. (see above). The zeolite is then dried and calcined if required.

In addition to the abovementioned IR techniques that are able to demonstrate that the preferably desired percentage exchange with regard to the first metal has been achieved, the advantage of the method for the application according to the invention can also be determined in other ways, using, for example, electron microscopy or CO chemisorption. By this means it is possible to map what the final dispersion of noble metal has become as a function of the sequence. In the case of CO chemisorption, for example, the amount of CO to be bound is a measure of the dispersion of the noble metal.

The catalyst of the invention, obtainable by the method for preparation according to the invention, comprises a zeolite being loaded with a first metal selected from the group of noble metals consisting of ruthenium, rhodium, silver, rhenium, osmium, iridium, platinum and gold, and with a second metal selected from the group of transition metals consisting of vanadium, chromium, manganese, iron, cobalt, nickel and copper. In a preferred embodiment, the catalyst of the invention consists of the zeolite, i.e. the catalyst of the invention is the zeolite as prepared according to the invention (optionally provided to a support). Preferred zeolites are selected from the group consisting of FAU, FER, CHA, MOR, MFI, BEA, EMT, CON, BOG and ITQ-7, especially FER, CHA and BEA. Preferred first metals are selected from the group consisting of ruthenium, rhodium, osmium and iridium, even more preferred are Ru, Rh and Ir. In another embodiment, the catalyst of the invention may further comprise other catalysts, e.g. other catalysts suitable for the decomposition of $N_2O$ and/or catalysts suitable for the decomposition of $NO_x$.

In contrast to prior art catalysts (wherein e.g. first the transition metal ion has been introduced in the zeolite and then the noble metal) the catalyst of the invention comprises a zeolite wherein about 2-50% of the Al is coordinated by the first metal. Another important distinction of the catalyst (i.e. zeolite) of the invention is that the zeolite has a relatively constant concentration of first metal through the bulk of the zeolite particles and an even concentration over the different zeolite particles. The concentration of the first metal in a zeolite particle (for example a pressed zeolite particle of about 0.1-5 mm diameter) can be measured at different positions (local concentrations) within the particle, (e.g. by SEM/EDX) thereby providing a mean first metal concentration. Hence, herein the term "local" concentration refers to a concentration measured by SEM/EDX at one spot of a zeolite particle, preferably with a scan resolution of about 0.5-5 $\mu m^2$, preferably a scan resolution of about 0.1-1 $\mu m^2$. Herein, a zeolite having a mean (first) metal concentration refers to the bulk (or mean) concentration of e.g. a zeolite crystallite (e.g. about 0.1-10 $\mu m$), a zeolite (bulk) powder (e.g. consisting of such crystallites), a pressed particle, etc. A number of measurements of local concentrations may be used to calculate a mean metal concentration. For example, determining the concentration at one spot of about 0.1-1 $\mu m^2$, moving to another spot in the zeolite powder or another spot in the zeolite crystallite, e.g. at a distance of a few $\mu m$'s from the first spot, and determining a second local concentration, etc. Averaging the local (first) metal concentrations measured provides the mean (first) metal concentration. It appears that the zeolite catalyst provided according to the method of preparation of the invention is a zeolite, wherein local first metal concentrations advantageously appear to have concentration deviations of not larger than 50%, preferably not larger than 30%, and more preferably not larger than 20%, of the mean first metal concentration. Hence, there is provided a zeolite having a mean first metal concentration, and wherein any local first metal concentration may have a concentration deviation of not larger than 50% of the mean first metal concentration. The surprisingly even distribution of the first metal may provide the good $N_2O$-decomposition results of the present catalysts; in case the opposite order of loading was chosen, lower $N_2O$ conversions are obtained.

EXAMPLES

Test Equipment

The catalytic decomposition of $N_2O$ (and any $NO_x$) was studied in a semi-automatic test set-up. Gases are supplied using so-called mass flow controllers (MFC) and water is added by means of a saturator that is set to the correct temperature. Lines are heated to 130° C. to counteract condensation. For the experiments a quartz reactor with an internal diameter of 0.6 to 1 cm was placed in an oven. The catalyst sieve fraction (0.25-0.5 mm) was placed on a quartz gauze. Quantitative analysis of the gas phase is possible by the use of a calibrated Bomen MB100 Fourier transform infrared (FTIR) spectrometer equipped with a model 9100 gas analyser or with the aid of a Perkin Elmer GC-TCD. The carrier gas (balance) in the examples is $N_2$.

Example 1

Preparation of Loaded Zeolites

Catalysts Prepared:

| Catalyst | Description |
|---|---|
| Cat 1 | Rh-MOR |
| Cat 2 | Rh-alumina ($Al_2O_3$) |
| Cat 3 | Cu—Rh-MOR |
| Cat 4 | Rh—Cu-MOR |
| Cat 5 | Co—Rh-MOR |
| Cat 6 | Fe-FER |
| Cat 7 | Fe—Ru-FER |
| Cat 8 | Fe—Ir-FER |
| Cat 9 | Fe—Rh-FER |
| Cat 10 | Fe—Ru-MOR |
| Cat 11 | Ru-FER |
| Cat 12 | Co-MOR |
| Cat 13 | Co—Rh-FER |
| Cat 14 | Fe-ZSM-5 |
| Cat 15 | Ru-ZSM-5 |
| Cat 16 | Fe—Ru-ZSM-5 |
| Cat 17 | Fe-BEA |
| Cat 18 | Fe—Ru-BEA |

Cat 1: Rh-MOR

In a first step Rh-MOR was prepared with the aid of ion exchange. $NH_4$-MOR powder (Zeolyst, CBV21a) in 1.5% rhodium nitrate (Johnsson & Matthey) was stirred together with 0.1 M $NH_4NO_3$ for 16 h at 80° C. The zeolite was then filtered off, washed thoroughly with demineralised water and dried for 16 h at 80° C. The zeolite is loaded with 0.35% (m/m) Rh (chemical analysis: digestion of metals (everything is dissolved in concentrated acid) and components are determined using ICP/AAS).

Cat 2: Rh-alumina ($Al_2O_3$)

Rh-alumina was prepared with the aid of wet impregnation. A concentration of rhodium nitrate corresponding to 1% (m/m) rhodium was applied to the alumina in a volume that was approx. twice the volume of the pores.

Cat 3: Cu—Rh-MOR

In a first step Rh-MOR was prepared with the aid of ion exchange. $NH_4$-MOR powder (Zeolyst, CBV21a) in 1.5% rhodium nitrate (Johnsson & Matthey) was stirred together with 0.1 M $NH_4NO_3$ for 16 h at 80° C. The zeolite was then filtered off, washed thoroughly with demineralised water and dried for 16 h at 80° C. The zeolite is loaded with 0.35% (m/m) Rh (chemical analysis). In a second step a volume of copper nitrate was added to the rhodium-MOR equal to the pore volume of rhodium MOR and with a concentration resulting in 4.9% (m/m) copper. The zeolite was then filtered off, washed thoroughly with demineralised water and dried for 16 h at 120° C.

Cat 4: Rh—Cu-MOR

The same method of preparation as above was followed except that exchange with copper was first carried out, as described in the second step above. The zeolite is loaded with 5% (m/m) Cu and 0.35% (m/m) Rh (chemical analysis). This catalyst was prepared analogously to JP patent application Hei-06 154611 (first Cu, then Rh; percentages by weight 5% (m/m) Cu and 0.35% (m/m) Rh).

Cat 5: Co—Rh-MOR

In a first step Rh-MOR was prepared with the aid of ion exchange. $NH_4$-MOR powder (Zeolyst, CBV21a) in 1.5% rhodium nitrate (J&M) was stirred together with 0.1 M $NH_4NO_3$ for 16 h at 80° C. The zeolite was then filtered off, washed thoroughly with demineralised water and dried for 16 h at 80° C. The zeolite is loaded with 0.35% (m/m) Rh (chemical analysis). In a second step a volume of cobalt nitrate was added to rhodium-MOR equal to the pore volume of rhodium MOR and with a concentration resulting in 2.8% (m/m) cobalt. The zeolite was then filtered off, washed thoroughly with demineralised water and dried for 16 h at 120° C.

Cat 6: Fe-FER

Fe-FER was prepared using pore volume impregnation: a volume of iron nitrate was added to $NH_4$-FER (Tosoh; Si/Al 9)) equal to the pore volume of FER and with a concentration resulting in 2.5% (m/m) iron. The zeolite was then filtered off, washed thoroughly with demineralised water and dried for 16 h at 120° C.

Cat 7: Fe—Ru-FER 2.3 gram $Ru(NH_3)_6Cl_3$ (J&M) was dissolved in 100 ml demineralised water and stirred with Na-FER (Tosoh) for 16 hours at 80° C. The zeolite was then filtered off, washed thoroughly and dried at 80° C. It was then stirred for 24 hours at room temperature with 0.1 M $NH_4NO_3$. The zeolite was then filtered off, washed thoroughly and dried at 80° C. A volume of iron nitrate was then added to Ru-$NH_4$-FER equal to the pore volume of Ru-FER and with a concentration resulting in 2.5% (m/m) iron. Loading 0.41% (m/m) Ru and 2.5% (m/m) Fe.

Cat 8: Fe—Ir-FER 400 mg $IrCl_3$ was dissolved in 300 ml conc. HCl. A volume of $IrCl_3$ was then added to $NH_4$-FER equal to the pore volume of FER, according to the pore volume impregnation method, filtered off, washed thoroughly with demineralised water and dried at 80° C.: loading 0.2% (m/m) Ir. A volume of iron nitrate was then added to Ir-$NH_4$-FER equal to the pore volume of Ir-FER and with a concentration resulting in 2.5% (m/m) iron.

Cat 9: Fe—Rh-FER

Rh-FER was stirred in 1.5% (m/m) rhodium nitrate (J&M) together with 0.1 M $NH_4NO_3$, analogously to the methods described above for iron exchange. A volume of iron nitrate was then added to rhodium-$NH_4$-FER equal to the pore volume of rhodium-FER and with a concentration resulting in 2.5% (m/m) iron and 0.3% (m/m) Rh.

Cat 10: Fe—Ru-MOR 2.3 g $Ru(NH_3)_6Cl_3$ (J&M) was dissolved in 100 ml demineralised water and stirred with Na-MOR (Zeolyst CBV10a) for 16 hours at 80° C. The zeolite was then filtered off, washed thoroughly and dried at 80° C. It was then stirred for 24 hours at room temperature with 0.1 M $NH_4NO_3$. The zeolite was then filtered off, washed thoroughly and dried at 80° C. A volume of iron nitrate was then added to Ru-$NH_4$-FER equal to the pore volume of Ru-FER and with a concentration resulting in 2.5% (m/m) iron. Loading 0.41% (m/m) Ru and 2.5% (m/m) Fe.

Cat 11: Ru-FER 2.3 g $Ru(NH_3)_6Cl_3$ (J&M) was dissolved in 100 ml demineralised water and stirred with Na-FER (Tosoh) for 16 hours at 80° C. The zeolite was then filtered off, washed thoroughly and dried at 80° C. It was then stirred for 24 hours at room temperature with 0.1 M $NH_4NO_3$. The zeolite was then filtered off, washed thoroughly and dried at 80° C. Loading is 0.4% (m/m) Ru.

Cat 12: Co-MOR

Co-MOR was prepared by adding a volume of cobalt nitrate to $NH_4$-MOR (Zeolyst CBV21a) equal to the pore volume of MOR and with a concentration resulting in 2.8% (m/m) cobalt.

Cat 13: Co—Rh-FER

Rh-FER was stirred in 1.5% (m/m) rhodium nitrate (J&M) together with 0.1 M $NH_4NO_3$, analogously to the methods described above for ion exchange. In a second step a volume of cobalt nitrate was then added to rhodium MOR (0.3% (m/m) Rh) equal to the pore volume of rhodium MOR and with a concentration resulting in 2.5% (m/m) cobalt. The zeolite was then filtered off, washed thoroughly with demineralised water and dried for 16 h at 120° C.

Cat 14: Fe-ZSM-5

The catalyst was prepared with the aid of ion exchange of Alsi-penta SN27 zeolite ZSM-5 in the liquid phase with $FeCl_2.4H_2O$ (which ought to lead to a loading of 2.5% (m/m) Fe) at 16 hours 80° C., as also described above. The zeolite was then filtered off, washed thoroughly and dried at 80° C. Before the reaction the catalyst was calcined in situ for 5 h at 550° C.

Cat 15: Ru-ZSM-5

The catalyst was prepared with the aid of ion exchange of Alsi-penta SN27 zeolite ZSM-5 in the liquid phase with $Ru(NH_3)_6Cl_3$ (which ought to lead to a loading of 0.3% (m/m) Ru) at 16 hours 80° C., as also described above. The zeolite was then filtered off, washed thoroughly and dried at 80° C. Before the reaction the catalyst was calcined in situ for 5 h at 550° C.

Cat 16: Fe—Ru-ZSM-5

The catalyst was prepared with the aid of co-ion exchange of Alsi-Penta SN27 zeolite ZSM-5 in the liquid phase with $FeCl_2.4H_2O$, $Ru(NH_3)_6Cl_3$ (which ought to lead to a loading of 0.3% (m/m) Ru and 2.5% (m/m) Fe) at 16 hours 80° C., as also described above. The zeolite was then filtered off, washed thoroughly and dried at 80° C. Before the reaction the catalyst was calcined in situ for 5 h at 550° C.

Cat 17: Fe-BEA

The catalyst was prepared with the aid of ion exchange of Zeolyst BEA CP814e. The NH4-BEA was exchanged with an amount of $FeSO_4.7H_2O$ that equals 2.5% (m/m) Fe. The zeolite was then filtered off, washed thoroughly and dried at 80° C. The catalysts was calcined before reaction at 550° C.

Cat 18: Fe—Ru-BEA

The catalyst was prepared with the aid of ion exchange of Zeolyst BEA CP814e. The $NH_4$-BEA was first exchanged with 1M $NaNO_3$ to obtain the sodium form BEA. Subsequently, the Na-BEA was exchanged with $Ru(NH_4)_2Cl_6$ (J&M) resulting in a loading of 0.3% (m/m) Ru. The zeolite was then filtered off and washed thoroughly to obtain Ru-BEA. Fe—Ru-BEA was obtained by ion-exchange of Ru-BEA with $FeCl_2$ resulting in a loading of 2.3% (m/m) Fe. The zeolite was then filtered off, washed thoroughly and dried at 80° C. The catalyst was calcined before reaction at 550° C.

Example 2

Decomposition of $N_2O$ with the Aid of Rh-alumina and Rh-MOR $N_2O$ was decomposed with the aid of Cat 1 and Cat 2 under the following conditions with the following results:

TABLE 1

Reaction conditions Example 2

| | |
|---|---|
| Volume | 0.3 ml |
| Gas flow velocity | 150 ml/min |
| GHSV | 30000 $h^{-1}$ |
| T | 400° C. |
| P | 1 bara |
| $N_2O$ | 1500 ppm |
| NO | 200 ppm |
| $H_2O$ | 0.5% |
| $O_2$ | 2.5% |
| $N_2$ | bal. |

TABLE 2

Results of $N_2O$ conversion in Example 2

| Time (hours) | Conversion (%) of $N_2O$ with rhodium-MOR (Cat 1) | Conversion (%) of $N_2O$ with rhodium-$Al_2O_3$ (Cat 2) |
|---|---|---|
| 2 | 60 | 65 |
| 4 | 58 | 64 |
| 8 | 59 | 64 |
| 10 | 60 | 63 |
| 12 | 61 | 63 |
| 14 | 58 | 62 |
| 16 | 60 | 62 |
| 18 | 60 | 62 |
| 20 | 59 | 61 |
| 22 | 60 | 61 |
| 24 | 60 | 60 |
| 26 | 61 | 60 |
| 28 | 58 | 60 |
| 30 | 60 | 59 |
| 32 | 60 | 58 |
| 34 | 58 | 60 |
| 36 | 59 | 57 |
| 38 | 61 | 57 |
| 40 | 58 | 56 |
| 42 | 60 | 55 |
| 44 | 60 | 54 |
| 46 | 59 | 54 |
| 48 | 60 | 53 |
| 50 | 60 | 53 |

It can be seen from this table that zeolites are more suitable supports than alumina. Rh-alumina is less stable and deactivates as a function of time.

Example 3

Decomposition of $N_2O$ with the Aid of Cu—Rh-alumina and Rh—Cu-MOR $N_2O$ was decomposed with the aid of Cat 3, Cat 4 and Cat 5 from Example 1 under the conditions as described in Example 2, Table 1, except that instead of 400° C. 430° C. was now used and instead of 0.5% there was now 5% $H_2O$ present. The following results were obtained here:

TABLE 3

Results Example 3:

| Time (hours) | Conversion (%) of $N_2O$ with copper-rhodium-MOR (Cat 3) | Conversion (%) of $N_2O$ with rhodium-copper-MOR (Cat 4) | Conversion (%) of $N_2O$ with cobalt-rhodium-MOR (Cat 5) |
|---|---|---|---|
| 1 | 34 | 37 | 79 |
| 5 | 48 | 48 | 77 |

TABLE 3-continued

Results Example 3:

| Time (hours) | Conversion (%) of N$_2$O with copper-rhodium-MOR (Cat 3) | Conversion (%) of N$_2$O with rhodium-copper-MOR (Cat 4) | Conversion (%) of N$_2$O with cobalt-rhodium-MOR (Cat 5) |
|---|---|---|---|
| 10 | 59 | 56 | 77 |
| 15 | 64 | 60 | 77 |
| 21 | 68 | 60 | 77 |
| 25 | 69 | 62 | 77 |
| 31 | 70 | 61 | 77 |
| 35 | 71 | 61 | 78 |
| 41 | 70 | 60 | 77 |
| 45 | 70 | 60 | 78 |
| 50 | 70 | 60 | 77 |
| 55 | 69 | 58 | 79 |
| 60 | 69 | 58 | 77 |
| 66 | 69 | 57 | 77 |
| 70 | 69 | 57 | 77 |
| 75 | 68 | 56 | 77 |
| 80 | 68 | 55 | 77 |
| 85 | 68 | 54 | 77 |
| 90 | 67 |    | 77 |
| 95 | 67 |    | 77 |
| 97 | 67 |    | 78 |

It can be seen from these results that the method according to the invention where a catalyst is used that has been prepared according to the invention (Cat 3; first a noble metal, then a transition metal) has better properties than a catalyst prepared according to the state of the art (Cat 4; first transition metal, then noble metal). Cobalt-rhodium-MOR (Cat 5), according to the invention, is also found to have even better properties than Cu-rhodium-MOR (Cat 3), likewise according to the invention.

Example 4

Decomposition of N$_2$O with the Aid of FER Exchanged with Fe, Fe/Ru, Re/Ir and Fe/Rh N$_2$O was decomposed with the aid of Catalysts 6-9 from Example 1 under the conditions as described in Example 2, Table 1, except that the temperature was varied, with the following results:

TABLE 4

Results Example 4:

| Temperature (°C.) | Conversion (%) of N$_2$O with iron-ferrierite (Cat 6) | Conversion (%) of N$_2$O with iron-ruthenium-ferrierite (Cat 7) | Conversion (%) of N$_2$O with iron-iridium-ferrierite (Cat 8) | Conversion (%) of N$_2$O with iron-rhodium-ferrierite (Cat 9) |
|---|---|---|---|---|
| 367 | 12 | 15 | 16 | 16 |
| 377 | 14 | 22 | 20 | 23 |
| 387 | 19 | 34 | 26 | 32 |
| 396 | 24 | 47 | 35 | 45 |
| 406 | 30 | 59 | 45 | 60 |
| 415 | 40 | 71 | 56 | 74 |
| 425 | 48 | 84 | 68 | 84 |
| 434 | 59 | 92 | 80 | 93 |
| 444 | 73 | 97 | 89 | 98 |
| 454 | 82 | 99 | 95 | 100 |
| 463 | 90 | 100 | 99 | 100 |
| 473 | 95 | 100 | 100 | 100 |
| 482 | 98 | 100 | 100 | 100 |
| 491 | 99 | 100 | 100 | 100 |

It can be seen from these results that the combinations according to the invention of Fe as second metal and a first metal such as Ru, Ir and Rh produce a clearly improved conversion.

Example 5

Decomposition of N$_2$O with the Aid of Fe—Ru-FER and Fe—Ru-MOR

N$_2$O was decomposed with the aid of Catalysts 7 and 10 from Example 1 under the conditions as described in Example 2, Table 1, except that the temperature was varied, with the following results:

TABLE 5

Results Example 5:

| Temperature (°C.) | Conversion (%) of N$_2$O with iron-ruthenium-FER (Cat 7) | Conversion (%) of N$_2$O with iron-ruthenium-MOR (Cat 10) |
|---|---|---|
| 368 | 17 | 5 |
| 378 | 27 | 6 |
| 387 | 38 | 9 |
| 397 | 52 | 14 |
| 406 | 67 | 20 |
| 416 | 79 | 30 |
| 425 | 89 | 42 |
| 435 | 95 | 55 |
| 444 | 100 | 68 |
| 454 | 100 | 80 |
| 463 | 100 | 91 |
| 473 | 100 | 96 |
| 483 | 100 | 100 |
| 492 | 100 | 100 |

Both catalysts according to the invention have good properties, but the combination of a first metal such as Ru, Ir and Rh with Fe as second metal provides even better properties (conversions) with zeolites such as FER than MOR.

Example 6

Decomposition of $N_2O$ with the Aid of a) Fe—Ru-FER and a Combination of Fe-FER and Ru-FER and b) Co—Rh-MOR and a Combination of Co-MOR and Rh-MOR $N_2O$ was decomposed with the aid of Catalysts 6, 7 and 11 from Example 1 under the conditions as described in Example 2, Table 1, except that the temperature was varied. Catalyst 7 was compared with a physical mixture of Catalyst 6 and 11 (a: Fe—Ru-FER and a combination of Fe-FER and Ru-FER). This mixture consisted of a physical mixture of 0.3 ml Cat 6 and 0.3 ml Cat 11 (total 0.6 ml).

$N_2O$ was decomposed with the aid of Catalysts 5, 1 and 12 from Example 1 under the conditions as described in Example 2, Table 1, except that the temperature was varied. Catalyst 5 was compared with a physical mixture of Catalyst 1 and 12 (b: Co—Rh-MOR and a combination of Co-MOR and Rh-MOR). This mixture consisted of a physical mixture of 0.3 ml Cat 1 and 0.3 ml Cat 12 (physical mixture: combine and homogenise for some time).

The following results were obtained:

TABLE 6

Results Example 6:

| Temperature (° C.) | Conversion (%) of $N_2O$ with iron-ruthenium-FER (Cat 7) | Conversion (%) of $N_2O$ with iron-FER + ruthenium-FER (Cat 6 + 11) | Conversion (%) of $N_2O$ with cobalt-rhodium-MOR (Cat 5) | Conversion (%) of $N_2O$ with rhodium-MOR + Co-MOR (Cat 1 + 12) |
|---|---|---|---|---|
| 368 | 17 | 13 | 12 | 4 |
| 378 | 27 | 17 | 20 | 10 |
| 387 | 38 | 24 | 30 | 15 |
| 397 | 52 | 33 | 45 | 24 |
| 406 | 67 | 44 | 62 | 34 |
| 416 | 79 | 59 | 78 | 55 |
| 425 | 89 | 79 | 90 | 86 |
| 435 | 95 | 100 | 98 | 100 |
| 444 | 100 | 100 | 100 | 100 |
| 454 | 100 | 100 | 100 | 100 |
| 463 | 100 | 100 | 100 | 100 |
| 473 | 100 | 100 | 100 | 100 |
| 483 | 100 | 100 | 100 | 100 |
| 492 | 100 | 100 | 100 | 100 |

It can be seen from this experiment that a physical mixture does not have the good properties such as the catalyst according to the invention. If the catalyst according to the invention is prepared, the presence of a first metal, such as Ru, Jr and Rh, and a second metal, such as Fe and Co, apparently produces a synergistic effect on the decomposition of $N_2O$. This synergistic effect is visible in particular at lower temperatures, such as between approx. 350-430° C., in particular 370-430° C.

Cat 5 was also tested in a $CH_4$-SCR setup as described in WO2004009220 under the conditions of table 3 of WO2004009220, but it appeared that this catalyst was not suitable for $NO_x$-conversion by $CH_4$ ($NO_x$-conversion$\leq$1% between 280-433° C.).

Example 7

Decomposition of $N_2O$ with the Aid of Co—Rh-MOR and Co—Rh-FER $N_2O$ was decomposed with the aid of Cat 5 and Cat 13 from Example 1 under the conditions as described in Example 2, Table 1, except that the temperature was varied.

TABLE 7

Results Example 7:

| Temperature (° C.) | Conversion (%) of $N_2O$ with Co—Rh-MOR (Cat 5) | Conversion (%) of $N_2O$ with Co—Rh-FER (Cat 13) |
|---|---|---|
| 367 | 12 | 13 |
| 377 | 20 | 22 |
| 387 | 30 | 34 |
| 396 | 45 | 50 |
| 406 | 62 | 68 |
| 415 | 78 | 84 |
| 425 | 90 | 95 |
| 434 | 98 | 99 |
| 444 | 100 | 100 |
| 454 | 100 | 100 |
| 463 | 100 | 100 |
| 473 | 100 | 100 |
| 482 | 100 | 100 |
| 491 | 100 | 100 |

It can be seen from these results that Co—Rh-FER also gives excellent results.

Example 8

Decomposition of $N_2O$ with the Aid of Co—Rh-MOR $N_2O$ was decomposed with the aid of Cat 5 from Example 1 under the conditions as described in Table 8a. The results are given in Table 8b.

TABLE 8a

Reaction conditions Example 8

| | |
|---|---|
| Volume | 38 ml |
| Gas flow velocity | 5 ml/min |
| GHSV | 7900 h$^{-1}$ |
| T | 400° C. |
| P | 1 bara |
| $N_2O$ | 1500 ppm |
| NO | 200 ppm |
| $H_2O$ | 0.5% |
| $O_2$ | 2.5% |
| $N_2$ | bal. |

TABLE 8b

Results Example 8:

| Temperature (° C.) | Conversion (%) of $N_2O$ with Co—Rh-MOR (Cat 5) |
|---|---|
| 309 | 2 |
| 326 | 7 |
| 343 | 17 |
| 360 | 41 |
| 375 | 74 |
| 395 | 96 |
| 412 | 100 |
| 429 | 100 |
| 446 | 100 |
| 463 | 100 |
| 480 | 100 |
| 498 | 100 |

It can be seen from these results that a removal efficiency of approx. 75% is possible at 375° C. with a long contact time.

Example 9

Decomposition of $N_2O$ with the Aid of ZSM-5 Exchanged with Fe, Fe/Ru and Ru $N_2O$ was decomposed with the aid of Catalysts 14-16 from Example 1 under the conditions as described in Example 2, Table 1, except that the temperature was varied.
The following results were obtained here:

TABLE 9

Results Example 9:

| Temperature (° C.) | Conversion (%) of $N_2O$ with Fe—Ru-ZSM-5 (Cat 16) | Conversion (%) of $N_2O$ with Fe-ZSM-5 (Cat 14) | Conversion (%) of $N_2O$ with Ru-ZSM-5 (Cat 15) |
|---|---|---|---|
| 367 | 6 | 8 | 9 |
| 377 | 10 | 9 | 11 |
| 387 | 16 | 14 | 15 |
| 396 | 23 | 22 | 17 |
| 406 | 33 | 32 | 25 |
| 415 | 45 | 45 | 32 |
| 425 | 59 | 56 | 41 |
| 434 | 73 | 68 | 48 |
| 444 | 85 | 79 | 60 |
| 454 | 93 | 88 | 75 |
| 463 | 97 | 94 | 83 |
| 473 | 100 | 98 | 93 |
| 482 | 100 | 100 | 98 |
| 491 | 100 | 100 | 100 |

It can be seen from these results that co-ion exchange (simultaneous exchange of first and second metal) in the liquid phase, that is to say simultaneous loading with Fe and Ru, also gives an improved catalyst compared with the analogous Ru-ZSM-5 and Fe-ZSM-5 loaded with a single metal.

Example 10

Decomposition of $N_2O$ with the Aid of BEA Exchanged with Fe or Fe and Ru $N_2O$ was decomposed with the aid of Catalysts 17 and 18 from Example 1 under the conditions as described in Table 10a, and that the temperature was varied (see Table 10b).

TABLE 10a

Reaction conditions Example 10

| Volume | 0.3 ml |
|---|---|
| Gas flow velocity | 150 ml/min |
| GHSV | 30000 h$^{-1}$ |
| P | 1 bara |
| $N_2O$ | 1500 ppm |
| NO | 200 ppm |
| $H_2O$ | 0.5% |
| $O_2$ | 2.5% |
| $N_2$ | bal. |

The following results were obtained here:

TABLE 10b

Results Example 10:

| Temperature (° C.) | Conversion (%) of $N_2O$ with Fe-BEA (Cat 17) | Temperature (° C.) | Conversion (%) of $N_2O$ with Fe—Ru-BEA (Cat 18) |
|---|---|---|---|
| 309 | 0 | 307 | 0 |
| 320 | 0 | 317 | 1 |
| 329 | 1 | 327 | 2 |
| 338 | 2 | 337 | 4 |
| 348 | 3 | 348 | 4 |
| 358 | 5 | 358 | 5 |
| 367 | 7 | 368 | 9 |
| 377 | 10 | 378 | 13 |
| 387 | 11 | 388 | 19 |
| 396 | 18 | 398 | 29 |
| 406 | 23 | 408 | 39 |
| 415 | 28 | 418 | 55 |
| 425 | 37 | 428 | 69 |
| 434 | 47 | 438 | 82 |
| 444 | 59 | 448 | 91 |
| 454 | 73 | 458 | 96 |
| 463 | 87 | 468 | 99 |
| 473 | 97 | 478 | 100 |
| 482 | 99 | 488 | 100 |
| 491 | 100 | 489 | 100 |

It can be seen from these results that the combination of Ru—Fe provides a significant higher $N_2O$-conversion, especially in the temperature range of about 385-470° C. Further, it appeared that the Fe—Ru-BEA catalyst is also very stable in the conversion of $N_2O$.

Example 11

Variation in Concentration of First Metal

The weight percentage of Rh was measured at different spots of samples of zeolites first loaded with Rh or first loaded with Cu. SEM/EDX (scanning electron microscopy/energy dispersive X-ray spectroscopy) measurements were performed with a JEOL-JSM-6330F microscope. Such measurements are known to the person skilled in the art. The samples are subjected to irradiation by a focused electron beam, which results in imaging of secondary or back-scattered electrons and energy analysis of x-rays for view and cross-section surface imaging and composition analysis. With the SEM/EDX analysis technique, particles can be imaged by SEM, providing information on the physical properties of particles including size, shape, and surface morphology, while EDX provides information on the elemental composition of particles.

TABLE 11

EDX results of Rhodium-Copper-MOR and Copper-Rhodium-MOR.

| | First Cu, then Rh (Cat 4) | | First Rh, then Cu (Cat 3) |
|---|---|---|---|
| Scan | Wt. % Rhodium | Scan | Wt. % Rhodium |
| scan 1 | 2.29 +/− 0.35 | scan 1 | 1.21 +/− 0.4 |
| scan 2 | 0.06 +/− 0.3 | scan 2 | 0.94 +/− 0.3 |
| scan 3 | 1.62 +/− 0.35 | scan 3 | 1.11 +/− 0.3 |
| scan 4 | 1.06 +/− 0.35 | scan 4 | 1.02 +/− 0.35 |
| Mean concentration | 1.26 | Mean concentration | 1.07 |
| Largest deviation of mean concentration | 95% (0.06/1.26) | Largest deviation of mean concentration | 13% (1.21/1.07) |

The four scans for each sample were taken with different particles with a scan resolution of 0.1-1 µm². It follows from the table that the rhodium concentration is highly heterogeneous when copper was loaded first, but that the largest deviation for the first Rh and then Cu loaded sample (according to the invention) is smaller than 20%.

The invention claimed is:

1. A method for the catalytic decomposition of $N_2O$ in a gas containing $N_2O$ in the presence of a catalyst, wherein the catalyst comprises a zeolite that has been loaded with a first metal comprising platinum, and with a second metal comprising iron, wherein the loading of the zeolite with metals has been obtained by first loading the zeolite with the first metal and then with the second metal, and wherein the zeolite comprises BEA.

2. The method according to claim 1, wherein the zeolite has been loaded with the first metal by means of ion exchange.

3. The method according to claim 1, wherein the zeolite contains 0.00001-4% (m/m) of the first metal and 0.1-10% (m/m) of the second metal.

4. The method according to claim 1, wherein the zeolite contains 0.1-0.5% (m/m) of the first metal and 1-4% (m/m) of the second metal.

5. The method according to claim 1, wherein the gas containing $N_2O$ also contains oxygen or water, or oxygen and water.

6. The method according to claim 1, wherein the gas containing $N_2O$ essentially contains no hydrocarbon.

7. The method according to claim 1, wherein the gas containing $N_2O$ contains less than 50 ppm hydrocarbon.

8. The method according to claim 1, wherein the gas containing $N_2O$ also contains $NO_x$, where x is equal to or greater than 1.

9. The method according claim 8, wherein a catalyst is also used for the removal of $NO_x$.

10. The method according to claim 1, wherein the gas containing $N_2O$ is fed through a chamber that contains the catalyst, wherein the chamber, the gas or both are heated if required.

* * * * *